United States Patent [19]
Fowler et al.

[11] Patent Number: 6,146,144
[45] Date of Patent: Nov. 14, 2000

[54] RUG HOOKING KIT AND METHOD FOR HANDICAPPED

[76] Inventors: Ernest R. Fowler; Betty Rutter Fowler, both of 11 Hunters Trail, Sandwich, Mass. 02563

[21] Appl. No.: 09/405,351

[22] Filed: Sep. 24, 1999

Related U.S. Application Data

[60] Provisional application No. 60/102,231, Sep. 29, 1998.
[51] Int. Cl.⁷ ................................................. G09B 11/00
[52] U.S. Cl. ........................... 434/81; 434/95; 289/17
[58] Field of Search ........................ 289/17, 1.5, 16.5; 434/81, 83, 95

[56] References Cited

U.S. PATENT DOCUMENTS

| | | | |
|---|---|---|---|
| 3,701,461 | 10/1972 | Bailly | 289/17 |
| 3,893,603 | 7/1975 | Rush | 289/1.5 |
| 4,124,153 | 11/1978 | Mann | 289/1.5 |
| 4,182,527 | 1/1980 | Meehan | 289/1.5 |
| 4,413,847 | 11/1983 | Doyel | 289/17 |

*Primary Examiner*—Sam Rimell

[57] ABSTRACT

A kit for making a hooked rug comprised of a backing made of a flexible yet stable material with offset, intermittent holes, a hook with a handle, embroidery needle, yarn, diagrams and written instructions, all of which are packed in a bag or box. The invention also discloses a method of making a hooked rug comprised of filling in each backing hole following a chart or a pattern drawn or stamped on the backing and using a continuous length of yarn drawn through the offset intermittent holes to provide the effect of a hooked rug random looping.

4 Claims, 9 Drawing Sheets

RUG HOOKING KIT AND METHOD FOR HANDICAPPED

This application claims the benefit of U.S. Provisional No. 60/102,231 filed Sep. 29, 1998.

BACKGROUND OF THE INVENTION

This invention relates to a craft kit, specifically hand rug hooking and needle art.

Traditional rug hooking dates back to the beginning of our country, when women often used old clothing to make floor coverings. The clothing was cut into strips and the strips were pulled through burlap or jute with a crude type of hook. The burlap or jute were actually discarded feed bags. As time went by, hooking rugs became an art, wherein women dyed old clothing, cut them into strips and made designs with them on burlap. Today the same craft is performed by many large hooking clubs throughout the country.

The traditional technique of making a hooked rug is as follows. A backing comprised of jute, burlap or monk cloth is first provided. Since this type of backing is woven, there are no noticeable holes in the backing. To make a rug with this technique, an instrument called a hook is used. An example of a hook used for hand hooking rugs may be seen in U.S. Pat. No. 3,701,461, issued on Oct. 31, 1972 to Louis Bailly. The Bailly hook produces a series of continuous loops made of yarn or fabric pulled through a canvas backing. Because the backing has very little stability, a taut stretching of the area being hooked is required. A hoop, which are two large round or oval rings, is usually used to produce the tautness. The backing material is held taut between these two rings. Another method of holding the backing taut is by stretching the rug across the hooker's lap with the hooker sitting on both ends of the rug.

The traditional method of making a hooked rug has several problems. The use of hoops is awkward and causes difficulty, especially if traveling. Stretching a backing across the hooker's lap is generally uncomfortable as the hooker's head must be bent completely downward in order to see the work in progress.

In addition, because the traditional backing used has no noticeable holes, the hooker must push through the material, pick up the yarn from the underneath, and pull the yarn back through the hole. This provides considerable stress and strain on the fingers and hands over time. Because of the stress and strain of pulling the yarn through the backing, the traditional way of hooking a rug becomes very painful, especially to persons handicapped with arthritis in the neck and hands.

Another particular disadvantage to working on jute, burlap, or monk cloth, is that the hooker is never sure where the next loop of yarn should be introduced. This can cause uneven loops. If the loops are too close together, the rug will pucker. If the loops are too far apart, the backing can be seen.

A finished hook rug can only be surfaced cleaned, because the underlying backing will disintegrate if soaked in water. Working with jute or burlap, and wool is uncomfortable, especially on warm weather as the backing is woven, made of hemp and does not breathe well. Adding wool yarn can also make the project dermatologically very uncomfortable. The finishing of a traditional rug is a complicated procedure using a piece of welting held under the edges of the finished rug and fastening it with a needle and wool yarn. The welting must be woven to keep the burlap, jute or monk cloth from fraying.

Latch hooking is another form of hooking rugs. Latch hook kits contain a stiff canvas or backing with holes perfectly aligned. A special instrument called a latch hook is required to pull previously cut yarn, each strand approximately 3" in length, through these holes causing a knot at the base of the backing on the top side. The result is a knotted, cut pile rug, sometimes referred to as a shag rug. An example of the latch hook rug form may be seen in U.S. Pat. No. 4,127,191, issued on Nov. 28, 1978 to J. K. Cave.

While traditional hook rugs and latch hook rugs require a backing and a hook, they are completely different in techniques and appearance. Latch hook rug backing have relatively large holes are perfectly aligned horizontally and vertically. Pieces of yarn are latched to each opening with a resulting yarn pattern that is uniform. By comparison, hooked rugs use a continuous length of yarn drawn through relatively tightly woven backing giving the effect of a random looping.

SUMMARY OF THE INVENTION

In view of the forgoing disadvantages involved with traditional hooked rug methods, the present invention provides an improved means and method for hooking rugs. As such, the general purpose of the present invention, which will be described subsequently in greater detail is to provide a craft kit geared to the needs of persons with arthritis, eye problems, and beginners in the art of hooking a rug. The kit comprises a backing made of a flexible yet stable material with offset, intermittent holes, a hook with a handle, embroidery needle, diagrams and written instructions which are packed in a bag or box.

Accordingly, several objects and advantages of the present invention are:

To provide a flexible backing that will be stable and yet will not require a hoop or other structure in order to produce a loop drawn through a hole with the hook.

To provide a flexible backing that has offset, intermittent holes surrounded by stretchable webbing, which will enable the hooker to produce a loop drawn through a hole with a hook requiring little or no stress or strain on the fingers or hands.

To provide a flexible backing that will allow the hooker a foolproof method of drawing the loop through the offset, intermittent holes with a hook, allowing the yarn used to expand.

To provide a method whereas, the filling in of each hole following a chart or a pattern drawn or stamped on the backing and using a continuous length of yarn drawn through the offset intermittent holes provides the effect of a random looping.

To provide a method whereas a person with vision problems can easily see the holes and follow a set of visual and written directions.

To provide a craft kit and method whereby a person with limited handicapped problems, such as stroke or head injuries, arthritis and carpal tunnel limitations may accomplish this craft method.

To provide a method of hooking a rug that is easy and may be completed in a short period of time.

To provide a backing that will allow air to flow through the holes, making the craft more comfortable in warm weather.

To provide a hooking apparatus that is approximately the same size as the holes. Whereas, the hook will slide into and out of the holes with ease carrying one or more strands of yarn with it.

To provide a hook with a handle.

To provide the correct amount of yarn required to form as many loops as needed to complete the rug, each loop being comprised of one or more continuous strands of yarn.

These together with other objects of the invention are pointed out with particularity in the claims annexed hereto and forming a part of this disclosure. For a better understanding of the invention, its operating advantages and the specific objects attained by its uses, reference should be made to the accompanying drawings and descriptive manner in which there is illustrated a preferred embodiment of the invention.

DETAILED DESCRIPTION OF THE INVENTION

Figure 1:
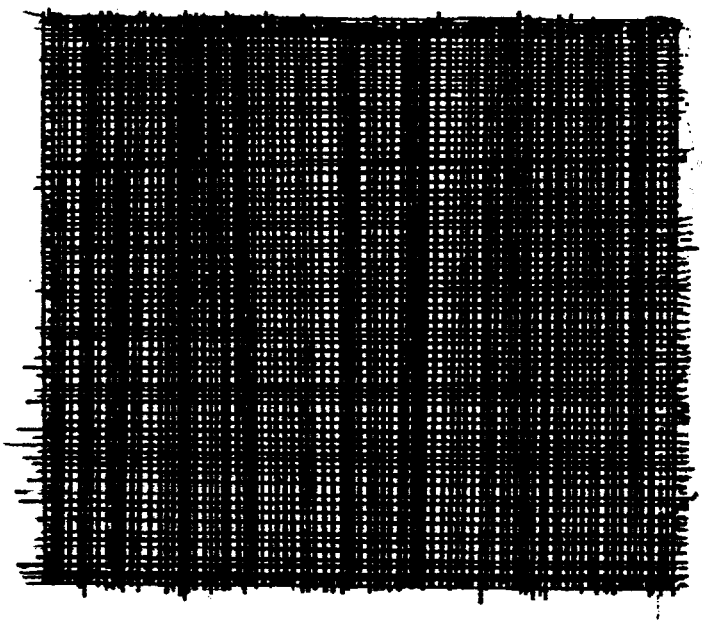
FIG. 1 illustrates a section of traditional hook rug backing.

Referring to the drawings in detail wherein like elements are indicated by like numerals, there is provided a kit for making a hooked rug, said kit having a backing 10 made of a flexible yet stable material with offset, intermittent holes 11, hooking tool 20 with a hook 21 and a handle 22, yarn 5, embroidery needle 25, diagrams 30 and written instructions 35 which are packed in a container, such as a bag 38 or a box.

Figure 2:
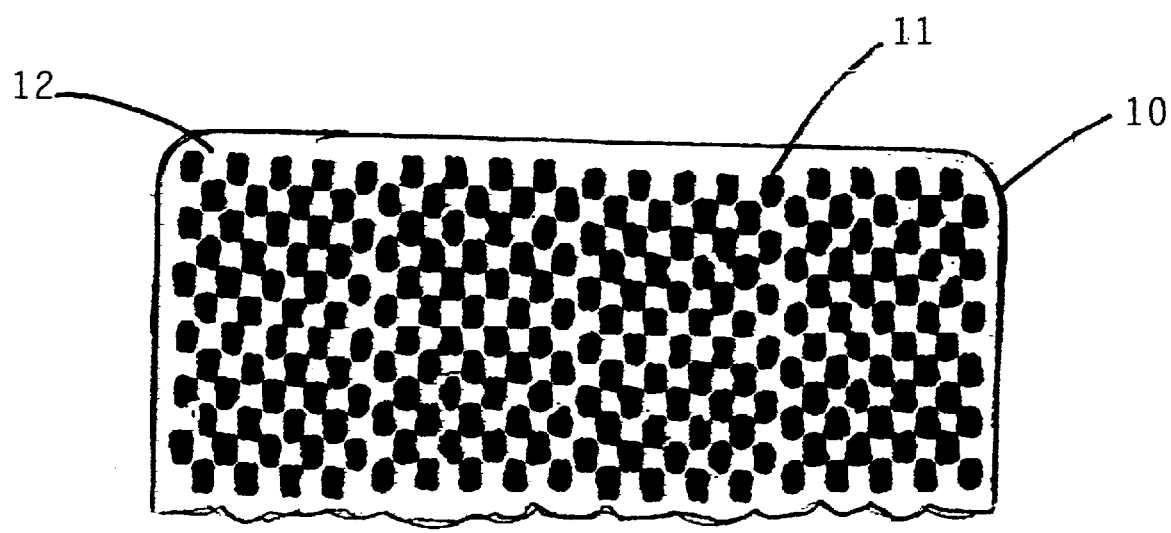
FIG. 2 illustrates a segment of the backing used in the present invention.
Figure 3:
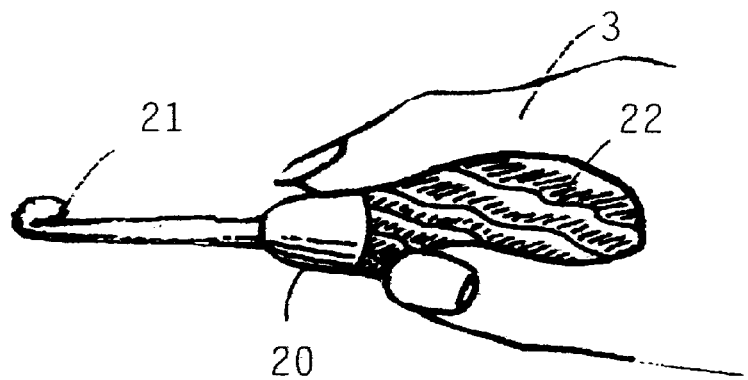
FIG. 3 illustrates an invention rug hook tool, positioned in a user's hand.
Figure 4:
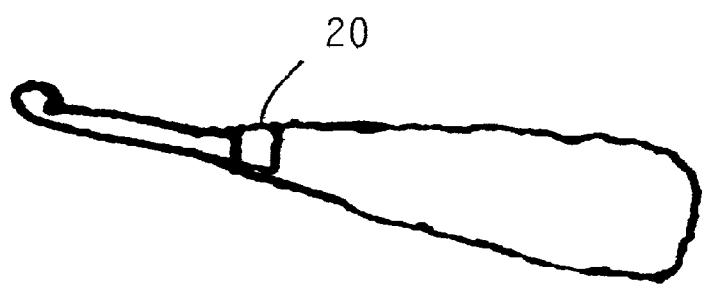
FIG. 4 is a diagrammed side elevational view of the invention hooking tool.
Figure 5:
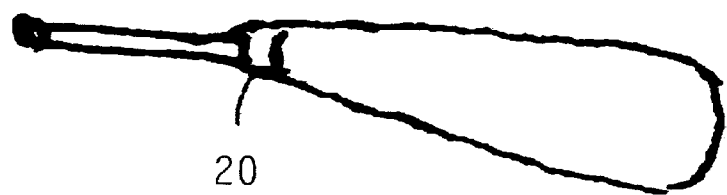
FIG. 5 is a diagrammed front elevational view of the invention hooking tool.

FIG. 1 illustrates a traditional hook rug backing made of burlap, jute or monk cloth. As may be seen, the backing is tightly woven providing the traditional rug hooker with many design options. However, the tightness of the weave also makes it an arduous process to pull yarn through the weave. FIG. 2 illustrates a segment of the backing 10 used in the present invention. FIG. 3 illustrates a rug hook tool 20, positioned in a user's hand 3 in a comfortable way as to make the process of drawing the yarn 5 and hook portion 21 of the tool 20 through the backing holes 11 attainable with little or no stress to the hand or fingers. FIG. 4 shows a side view of the hooking tool 20. FIG. 5 shows a front view of the hooking tool 20.

In comparison to the hole size of a traditional backing as shown in FIG. 1, the backing 10 of the present invention has relatively large holes 11 formed therein. The holes 11 are easy to see, are offset and are intermittent thereby providing flexibility of design. The larger sized holes 11 also permits the yarn 5 used to expand or breathe in a variety of environments. The placement of the backing holes 11 when filled with loops 6 of yarn 5, produces the look of a traditional hook rug. The backing's webbing 12 surrounding the holes 11 is flexible thereby allowing the hook 21 carrying the yarn 5 to pass through easily. The holes 11 are easy to see and are proximate in size to the hook 21 used.

Figure 11:
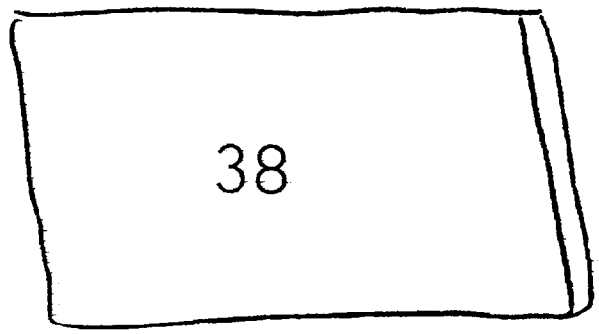
FIG. 11 illustrates a bag container.
Figure 12:
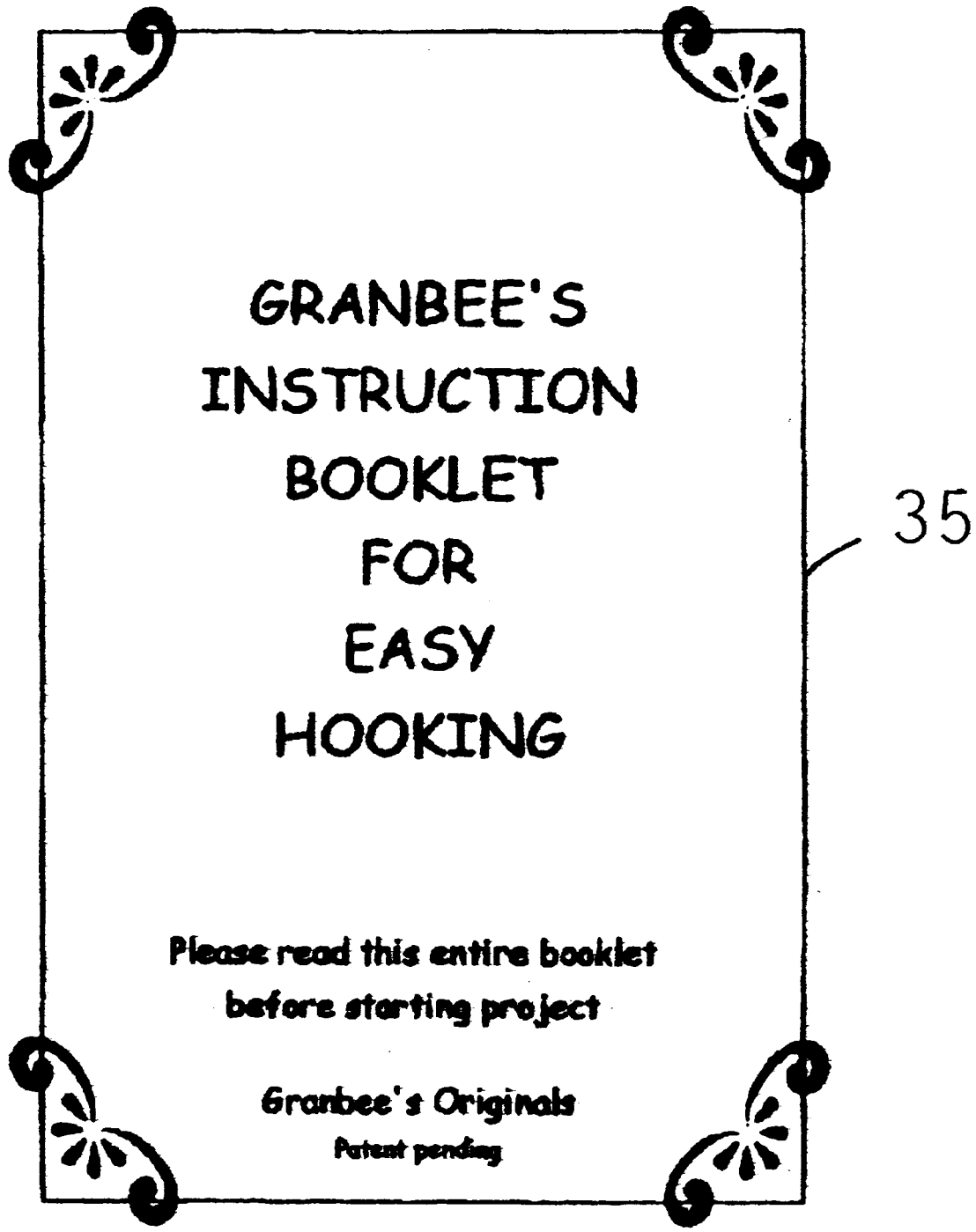
FIG. 12 is a plan view of a sample instruction booklet.
Figure 13:
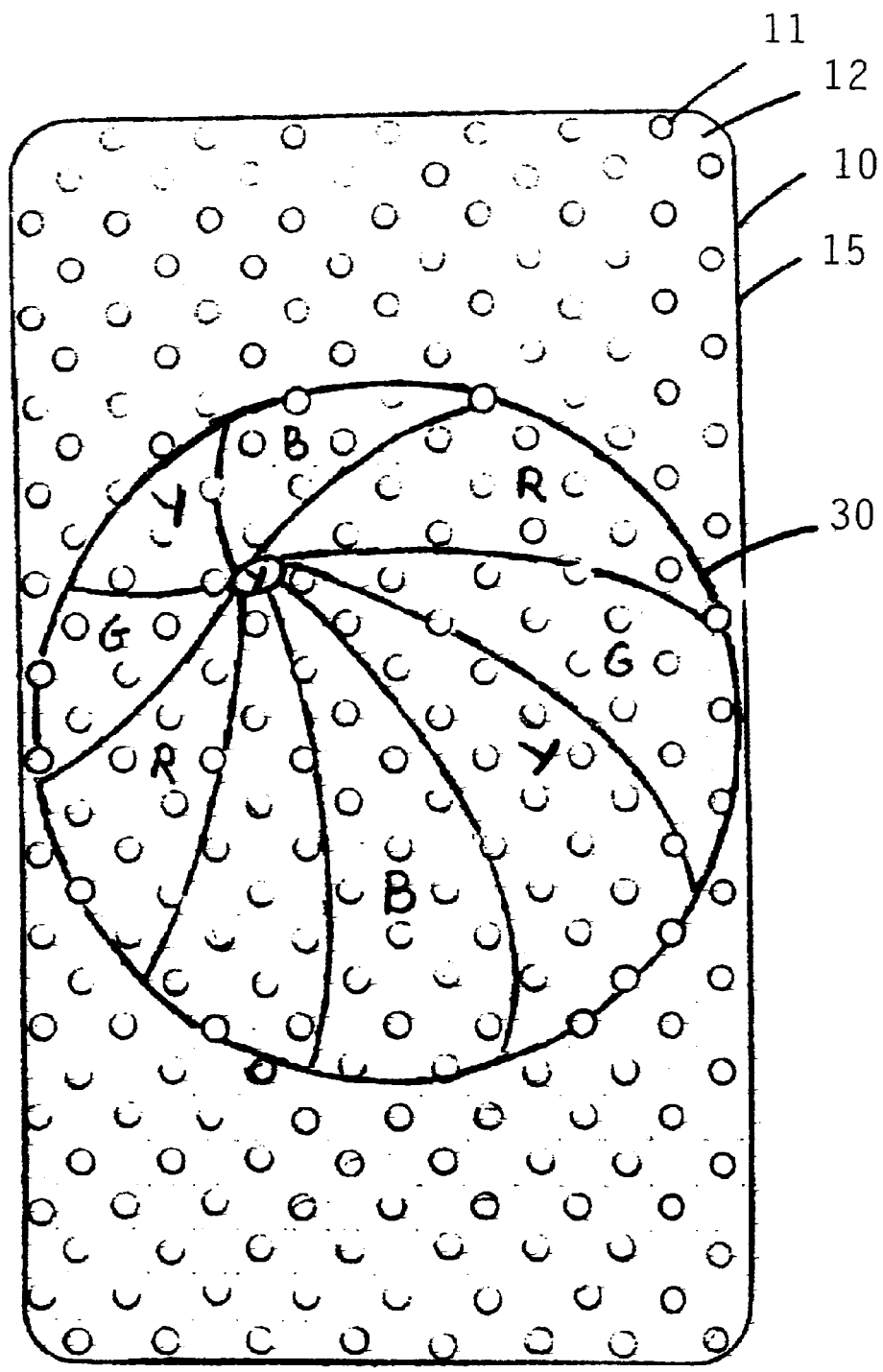
FIG. 13 is a plan view of a backing with diagram formed thereon.

Along with the above described features, included in the kit are written instructions 35 and diagrams 30 comprising a chart or pattern of a suggested kit design. The kit may be contained in a bag 38 made out of a sturdy, lightweight material as shown in FIG. 11, or may be contained in a gusset bag or box. The diagrams 30 may be separate stencils or may be formed on the backing itself as shown in FIG. 13. In this example the diagram 30 is of a beach ball. The letters B, Y, G and R represent yarn colors to be used, i.e., Blue, Yellow, Green and Red.

The method of the present invention is comprised of the following steps. A flexible backing 10 made of a flexible yet stable material with offset, intermittent holes 11, hooking tool 20 with a hook 21 and a handle 22, yarn 5, diagrams 30 and written instructions 35 are provided. The backing 10 has a top side 13, under side 14 and a peripheral edge 15. For exposition purposes, the hooker is presumed to be right handed.

Figure 6:
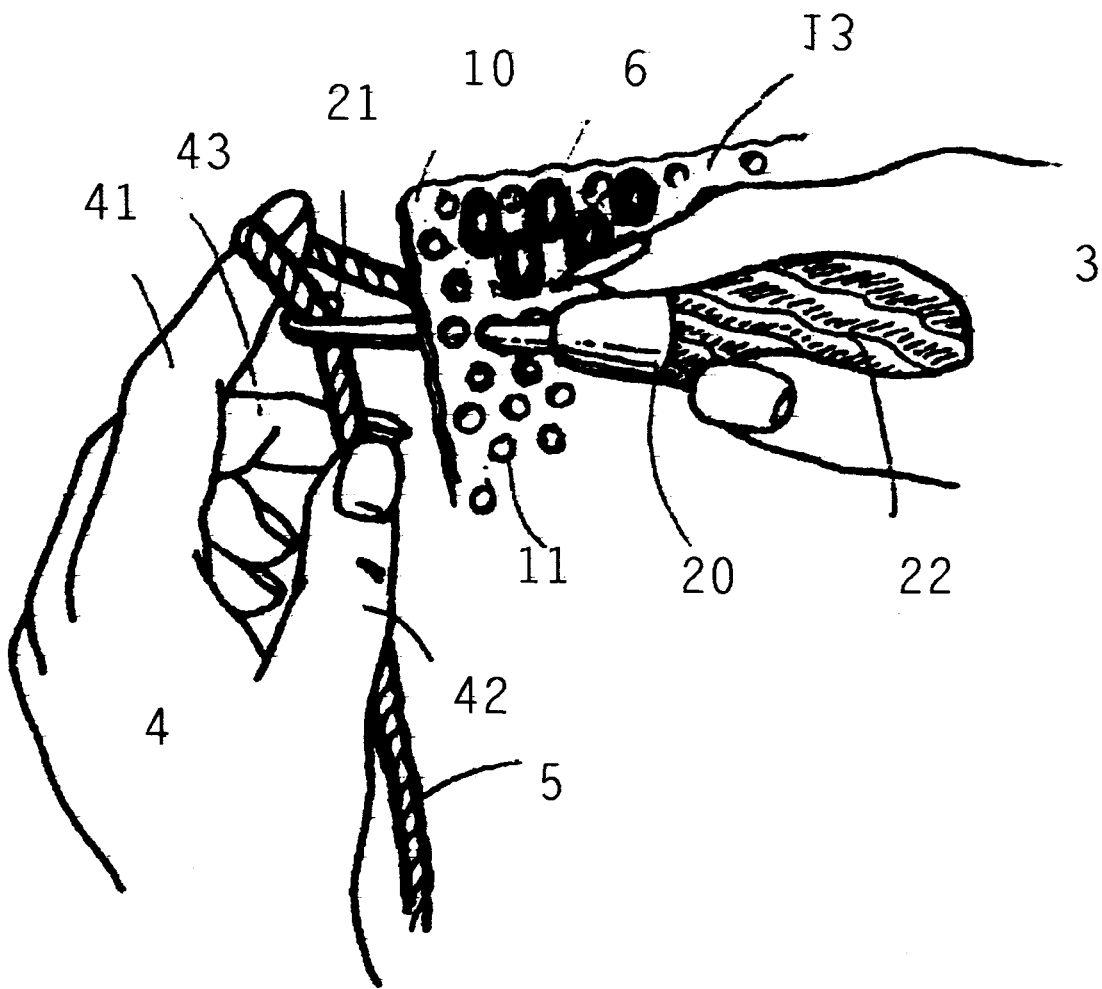
FIG. 6 illustrates a method positioning of the backing, hooking tool and yarn.
Figure 7A:
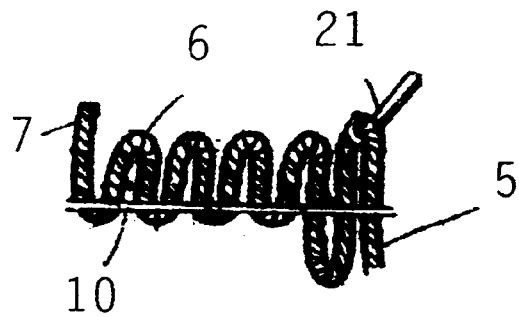
FIG. 7A illustrates the beginning step of the loop forming process.
Figure 7B:
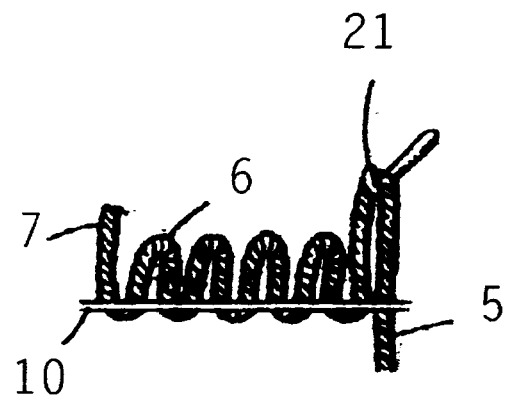
FIG. 7B illustrates the intermediate step in the loop forming process.
Figure 7C:
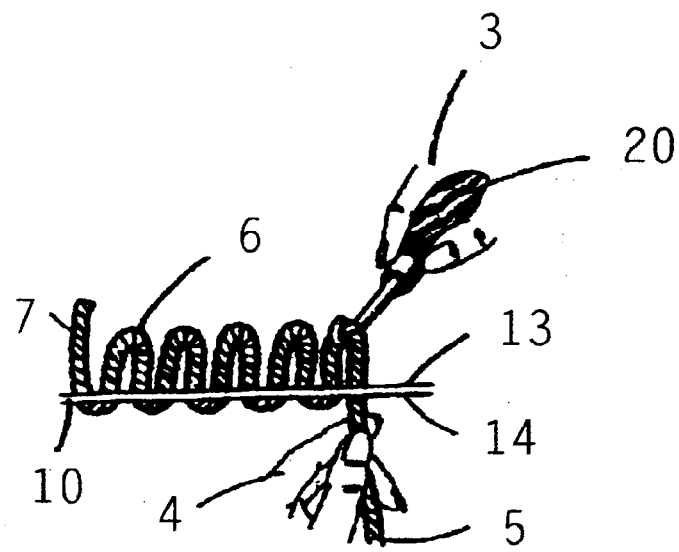
FIG. 7C illustrates the final step in the loop forming process.

The hooking tool 20 is grasped in the hooker's right hand 3 as shown in FIG. 3 and positioned above the backing top side 13. The yarn 5 is held in the hooker's left hand 4 and is positioned below the backing under side 14. See FIG. 6. Typically, the yarn 5 is held over the forefinger 41 and grasped and stretched by the thumb 42 and middle finger 43. The hooking tool 20 is inserted through a backing hole 11, hook 21 first, from backing top side 13 through backing under side 14. The hook 21 is manipulated to grasp the yarn 5. The hooking tool 20 is then pulled back through the hole 11 with a strand of yarn 5 in its hook 21. The yarn 5 is thereby pulled through the hole 11. See FIG. 7A. The yarn 5 is not completely pulled through the hole 11, rather just enough is pulled through to form a loop 6. The yarn 5 is pulled through as far as it will go without yanking it. See FIG. 7B. If the yarn 5 is pulled up too much, the previous loop will be pulled out. The loops 6 should be kept about the same height, i.e., one-quarter to one-half inch is preferable. The yarn 5 is then pulled down gently under the backing 10 with the left hand until the loop is the desired height. See FIG. 7C.

Figure 8:
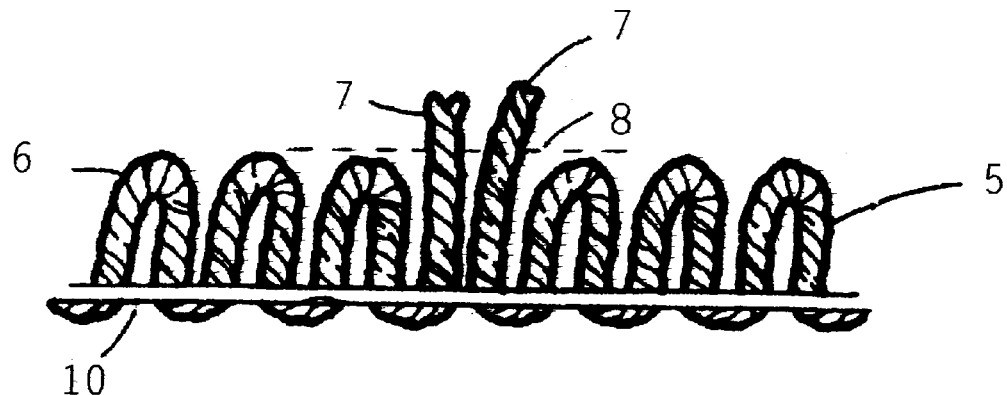
FIG. 8 illustrates tail termination in the loop forming process.
Figure 14:
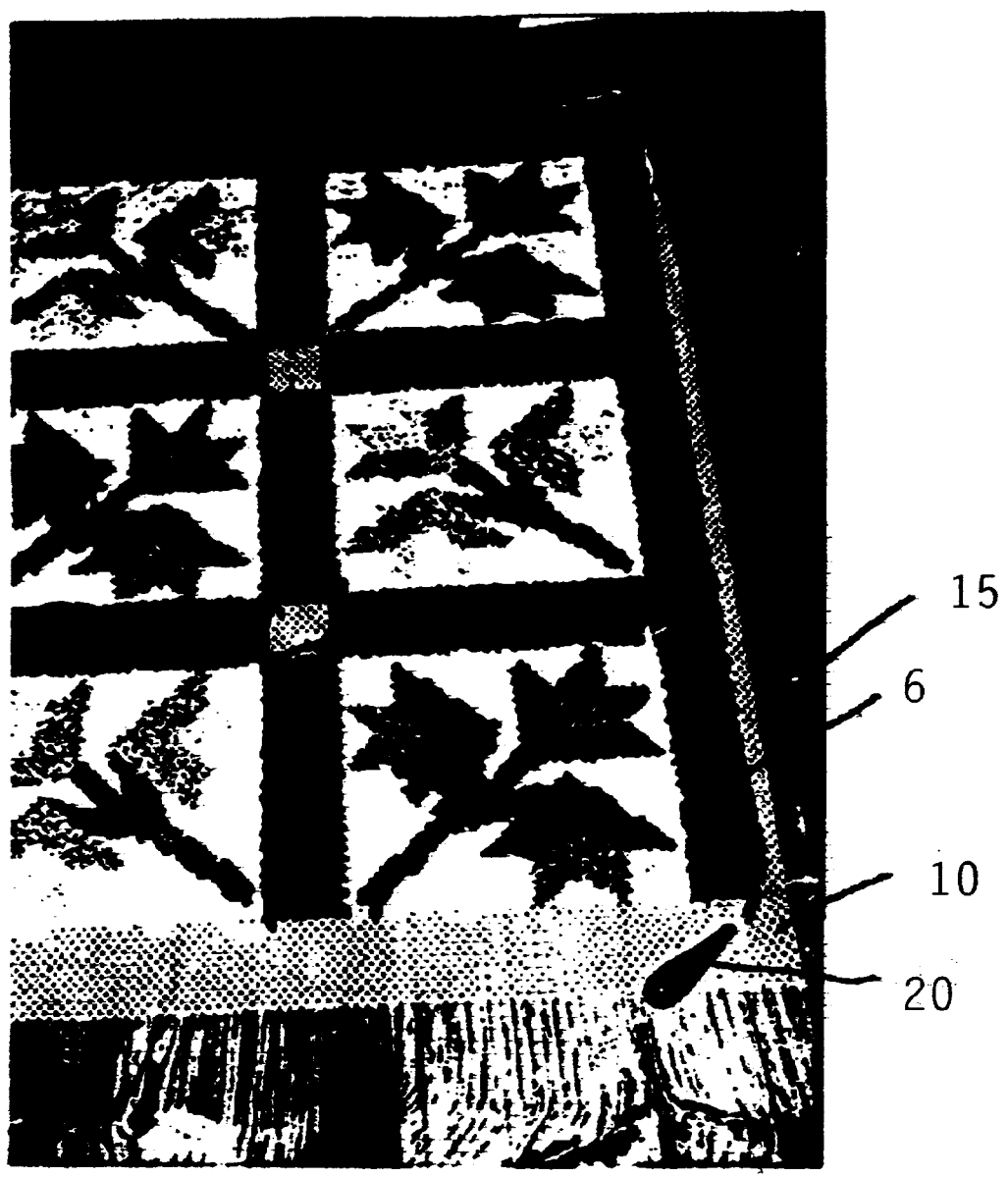
FIG. 14 illustrates a hooked rug in progress using the above described method.

The beginning and end of a strand of yarn 5 are each termed a "tail" 7. A new strand of yarn 5 may be desired for various reasons, i.e., change of color, change of texture, end of supply, etc. All tails 7 must appear on the backing top side 13. If a tail 7 is brought out on the backing under side 14 it will make a bump and the rug will not lie flat. Referring particularly to FIG. 8, after all of the holes 11 around a tail 7 have been worked, the tail 7 should be clipped along a line 8 to the same height as the loops 6 around it. The tail 7 will be locked in and practically invisible. FIG. 14 is an example of a hooked rug in progress using the above described method.

Figure 9:
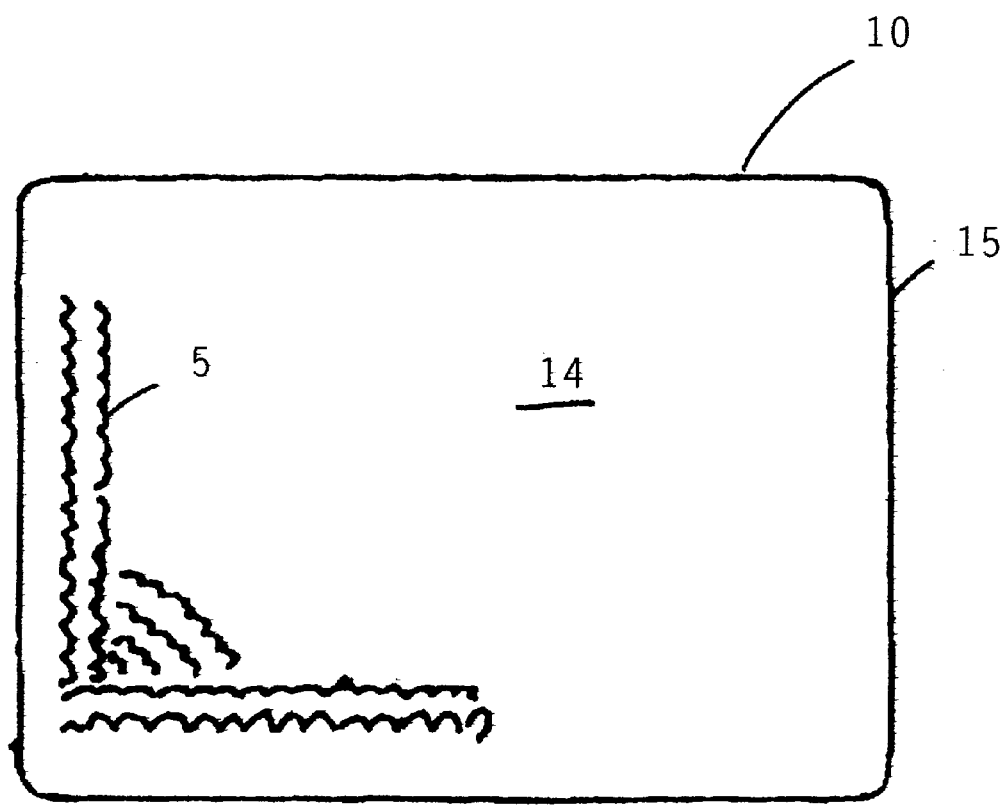
FIG. 9 illustrates the backing under side during the rug hooking process.

During the hooking process it is not uncommon to reach a point where to continue the hooker must cross over the back of an existing loop 6. However, crossing over a hole 11 that has already been worked will make a bump. The solution is to cut the yarn, making two tails 7. Each tail 7 should be left about an inch long and should terminate on the backing top side 13. The tail 7 may then be cut further to a height matching the height of adjacent loops. See FIG. 8. The backing under side 14 should not have any cross overs and would ideally look like the back of the rug illustrated in FIG. 9.

Figure 10:
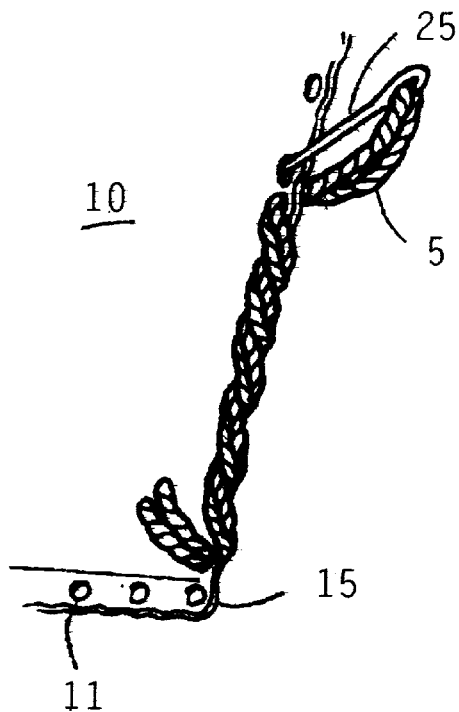
FIG. 10 illustrates a section of backing being whip stitched.

To finish the rug, the row of holes 11 nearest the backing outside perimeter peripheral edge 15 must be left empty. Using a large embroidery needle 25 threaded with two strands of yarn 5, the needle 25 is inserted in a backing hole 11 and worked from under to over each succeeding hole 11 about the backing peripheral edge 15. See FIG. 10. This technique is termed a whip stitch and will cover the backing raw edges, i.e., the peripheral edge 15. When complete or if tails are generated, the tail ends are tucked inside of the whip stitch. With the whip stitch completed, a soft, machine washable, hand hooked rug has been created.

Other embodiments may be readily devised by those skilled in the art which will embody the principles of the invention and fall within the spirit and scope thereof. For example, hookers may trace and place their own designs with several pieces of patterns provided in the kit. Diagrams may be presented as a "count and hook" technique wherein the pattern is on a chart and the hooker would count each hole and draw the yarn through the backing according to a color code on the chart. Kits may be provided with one or more stencils to design a hooked rug or wall hanging. A person can choose their own color yarn to hook the rug and then use the same stencil and paint to decorate furniture or walls. Needles may be used in conjunction with the hook to provide unusual stitches. Some kit projects using a needle combination would be purses, pillows, place mats, coasters, and wall hangings. Because of the invention's offset intermittent holes, many new varieties of stitch work can be performed. Kit projects using the above described backing can also include beading and the use of buttons. Kits using a medium other than yarn can include ribbon, or strips of cotton fabric giving the hooked rug a rag rug look. Also wool strips like the original hooked rugs can be used. When two or more strands of yarn are used, combining of colors to create a tweed look is a benefit as the hooker can create many colors.

Although the present invention has been described in its preferred embodiment, one skilled in the art will think of obvious variations or equivalents upon reviewing this description. All such variations or equivalents are intended to fall within the spirit and scope of the present invention, limited only by the appended claims.

We claim:

1. A kit for making a hook rug, comprising:
   a flat backing made of a flexible stretchable webbing material having a top side, an underside and a peripheral edge, and including rows of holes extending through said webbing with each row of holes laterally offset from each adjacent row of holes;
   a plurality of elongated colored fabric strips; and
   a hooking tool for drawing said strips through said backing, said tool having a rigid single piece hook attached to a rigid handle.

2. The kit as claimed in claim 1, wherein said strips are formed of a synthetic or natural fabric.

3. The kit as claimed in claim 1, wherein said strips are formed of yarn.

4. The kit as claimed in claim 1, wherein said hook is a crochet hook.

\* \* \* \* \*